H. H. SMITH.
LOCK WASHER.
APPLICATION FILED APR. 4, 1911.

1,008,084.

Patented Nov. 7, 1911.

Witnesses

Harvey H. Smith,
Inventor
by C. A. Snow & Co.
Attorneys

UNITED STATES PATENT OFFICE.

HARVEY H. SMITH, OF COLUMBUS, OHIO.

LOCK-WASHER.

1,008,084.     Specification of Letters Patent.     Patented Nov. 7, 1911.

Application filed April 4, 1911. Serial No. 618,891.

*To all whom it may concern:*

Be it known that I, HARVEY H. SMITH, a citizen of the United States, residing at Columbus, in the county of Franklin and State of Ohio, have invented a new and useful Lock-Washer, of which the following is a specification.

This invention relates to nut and bolt locks, and more especially to those wherein the nut is locked on the side by a spring-tongued washer plate; and the object of the same is to produce an improved form of washer for locking the nut on two adjacent bolts such as pass through the webs of the rails and the fish plates at each rail joint, although the invention is not limited to this use.

The following specification describes the details of my present idea, reference being had to the accompanying drawings in which—

Figure 1:
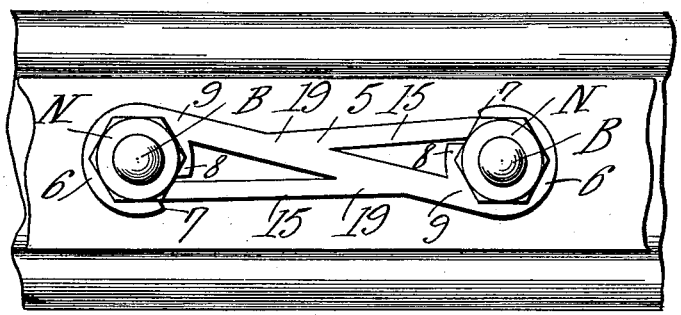
Figures 2, 2A:
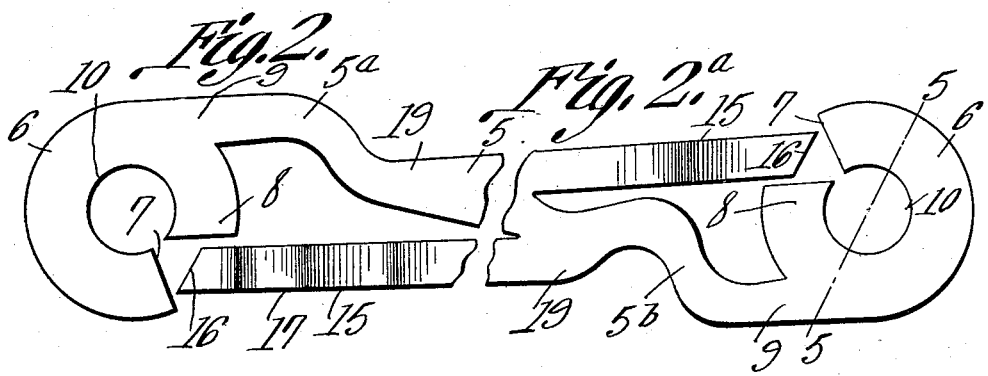
Figure 3:
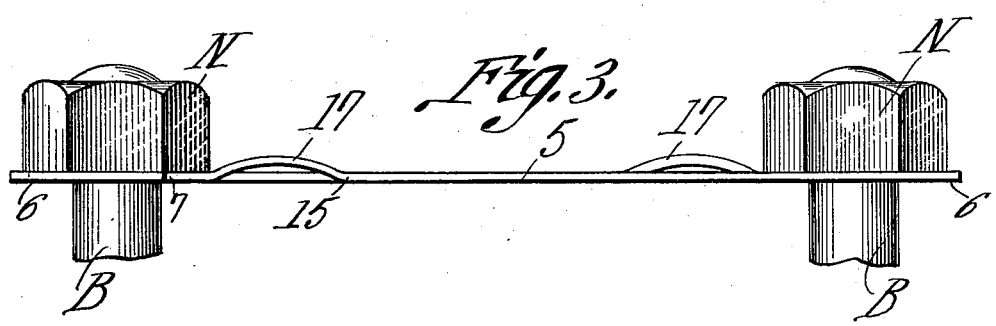
Figures 4, 5:
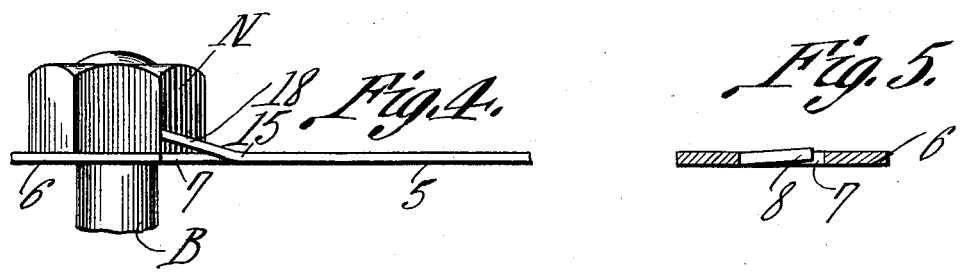

Figure 1 is a side elevation of this improved device applied to two adjacent bolts through a rail. Fig. 2 is a plan view of the washer alone, on a larger scale. Fig. 2ª is a similar plan view of the washer showing slight modifications in its shape, Fig. 3 is an edge view showing the nut-locking tongue as it appears before it comes to rest in its final position, the latter being shown in Fig. 4 which is another edge view of one end of the washer. Fig. 5 is a cross section on the line 5—5 of Fig. 2.

In the drawings, the letter R designates a rail in the present instance, through which are extended two bolts B and on the ends of the same are nuts N of hexagonal shape as usual. My improved washer is designed for locking these nuts against working off of their respective bolts by reason of the vibration to which the parts are subjected and also by reason of expansion and contraction due to atmospheric changes.

Coming now more particularly to the present invention, the reference numeral 5 designates the body of this improved washer as a whole, which also comprises at its extremities two washers proper 6, each of which is split as at 7 and given a slight twist so that its extremity 8 (see Fig. 5) rises above the remainder of the washer and the latter is therefore given a spring which takes up for the wear of parts, prevents rattle, affords automatic expansion if necessary, and yet will be compressed as the nut is screwed down very tightly—all as well understood in the art and forming no part of the present invention. I propose to connect two of these spring washers in a manner which will be described below and thus to include in this device all the advantages which said washer possesses. The body portion 5 of this improved locking washer is by preference formed integral with the two washer members 6 and extends tangentially therefrom as at 9 and at a point somewhat remote from the split 7 so that it will not interfere therewith. In Fig. 1 the body 5 is a straight member between the two points 9 and 9 where its extremities join the washers 6, and the tongues hereinafter to be described are struck from the sides of this member. In Fig. 2 the body makes a single bend as at 5ª, and in Fig. 2ª it makes an ogee bend as at 5ᵇ, these illustrations being merely typical to show that the body has no arbitrary shape. For special cases, the body should not be directly straight between the points 9 and 9, because if deflected somewhere and in some way it is obvious that if the holes or eyes 10 within the washers 6 do not come directly over two adjacent bolts B the body 5 may be straightened out a little to set said eyes farther apart or may be bent a little more to set said eyes closer together, and thus the entire locking washer will adapt itself to adjacent bolts which may be just a trifle out of their proper position. I consider this an important feature of the present invention.

The tongues 15 referred to above are by preference straps of metal integral with the body 5 at the points 19 and extending thence straight to their extremities 16 which are by preference beveled off slightly so that they are adapted to engage against one of the side faces of a hexagonal nut N, and these extremities stand within the cutouts or splits 7 of the washers 6 as best seen in Fig. 2, so that the entire device may be stamped from a single piece of sheet metal at one operation. The two tongues 15 are practically duplicates of each other, and a description of one will suffice for both. In the act of stamping out this locking washer, the tongue is given a little hump as seen at 17 in Fig. 3, the hump occurring within its body between its neck 19 where it joins the body 5 of the washer and its extremity 16, and preferably at about the position here shown. When now the device is put in position and after the nuts are applied, if the operator will strike the hump 17 a quite smart blow with a heavy hammer he will not only straighten it out to the position shown in Fig. 4 so that the tongue 15 will be flattened out throughout its length, but in thus straightening out the hump he will cause the outer end to be deflected upward as seen at 18 in Fig. 4, thereby accentuating the value of the beveled extremity 16 where it stands against the face of the hexagonal nut N and rendering it all but impossible to unscrew said nut because it is so difficult to again depress the elevated point 18 sufficiently to let the nut start off its threads. As this act of flattening out the hump slightly lengthens the tongue 15, care should be taken in the application of the entire locking washer that the extremities 16 thereof do not fit too closely against the sides of the nuts N in their initial position, and this adjustment of parts is permitted by bending the body 5 as at 5ª or 5ᵇ or in some other manner, so that it shall not form a straight line between the two points 9 and 9.

What is claimed is:

1. The herein described locking washer made entirely of one piece of metal and comprising two washers, each having a cut out in its body, a body member between and projecting tangentially from said washers at points remote from their cutouts, and tongues leading from said body and having oblique extremities standing in said cutouts, their bodies being provided initially with upward humps near their ends, for the purpose described.

2. The herein described locking washer made entirely of one piece of metal and comprising a plurality of spring washers, each having a cut out, a body member projecting tangentially from said washers at points remote from their cutouts, and itself having lateral bends between said points, and tongues leading from said body and having oblique extremities standing in said cutouts.

In testimony that I claim the foregoing as my own, I have hereto affixed my signature in the presence of two witnesses.

HARVEY H. SMITH.

Witnesses:
ADA M. JOHNSON,
LYMAN G. MOORE.

---

Copies of this patent may be obtained for five cents each, by addressing the "Commissioner of Patents, Washington, D. C."